United States Patent Office 2,995,695
Patented Aug. 8, 1961

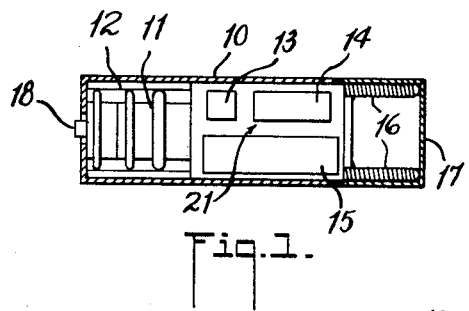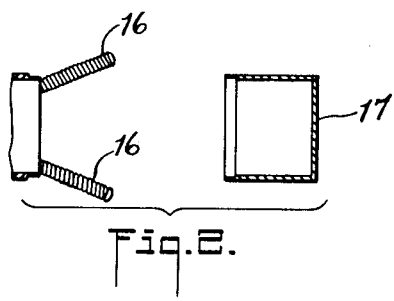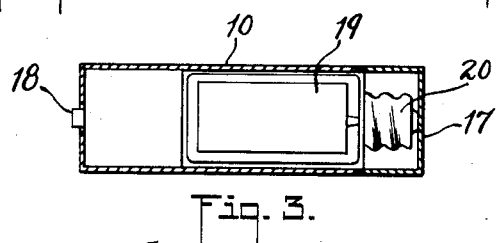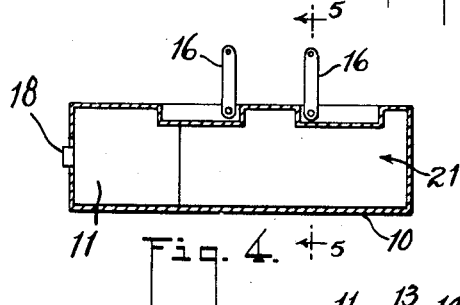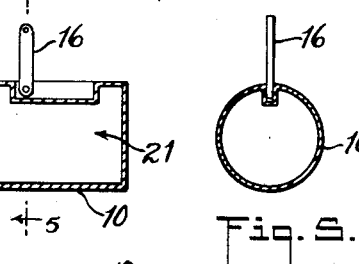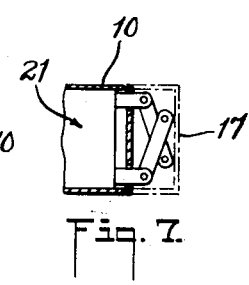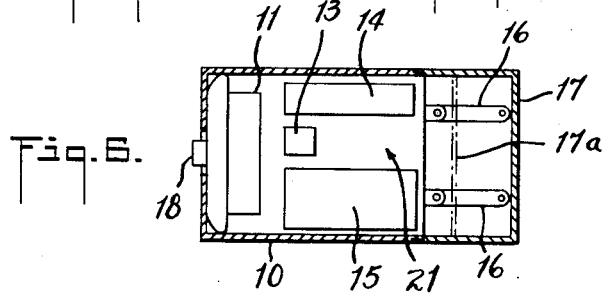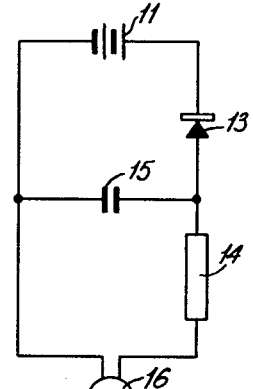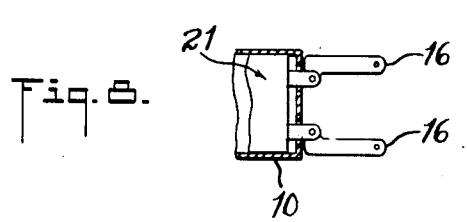
INVENTOR.
ROBERT W. REICH

2,995,695
RECHARGEABLE BATTERY
Robert Walter Reich, Rotackerstr. 2, Freiburg im
Breisgau, Germany
Filed Sept. 24, 1956, Ser. No. 611,626
9 Claims. (Cl. 320—2)

My invention relates to rechargeable batteries and more particularly to those rechargeable batteries which may be used to replace non-rechargeable dry-cell batteries in equipment.

At present, many batteries used in flashlights, hearing aids and similar devices are of the dry-cell type which cannot be recharged. These batteries go "dead" and as a consequence, the equipment is often inoperative when it is needed most. Some flashlights and other similar devices utilize lead-acid storage batteries, which can be recharged, as their power source. However, these cells must be constructed as an integral unit within the housing. This type of construction is not always practical and feasible and is only useful with simple devices.

Many flashlights and other electrical and electronic equipment, in use today, require several volts and as a result use multicell dry-cell units or several cells connected in series. It is possible to utilize units of my invention for replacement in flashlights or other electrical and electronic equipment which require one or more dry cells. In fact, I have found it expedient and practical to replace several dry-cell batteries with a single unit of my invention which delivers the proper voltage to the load and occupies the same space as the cells it replaces.

In addition, there are no devices available at present which comprise a housing wherein a storage battery and a charging circuit therefor are contained therewithin, and which housing has extending from the outside thereof prongs adapted for insertion into an outlet of a conventional line power source for the purpose of charging the battery.

It is a principal object of my invention to provide a rechargeable battery which may be used to replace dry-cell batteries in existing electrical equipment.

It is a further object of my invention to provide a battery which may be recharged without removing any of the components from the housing.

It is another object to provide a unitary structure containing a storage battery, a charging circuit therefor and means for coupling the charging circuit to an outside power source and for operatively associating the storage battery with a utilization device contained in a separate structure.

Other objects and advantages of my invention will be apparent during the course of the following description.

In the accompanying drawings, forming a part of this application, and in which like numerals are employed to designate like parts throughout the same, FIGURE 1 is a longitudinal view, partly in cross section, of a first embodiment of my invention, FIGURE 2 is a view of the spring plug and metal shell of the embodiment of FIGURE 1, showing the position of the plug with the metal shell removed, FIGURE 3 is a view similar to that of FIGURE 1 of a further embodiment of my invention wherein the means for connecting the device to the source of electrical power for charging is a lamp base, FIGURE 4 is a view similar to that of FIGURE 1 of a still further embodiment of my invention wherein the plug for connecting the device to the source of power for charging is along the outer shell and folds into the shell, FIGURE 5 is an end view of the embodiment of FIGURE 4, FIGURE 6 is a view similar to that of FIGURE 1 of a still further embodiment of my invention wherein the plug may be folded within the end cap of the device, FIGURE 7 is a view of a still further embodiment of the connecting plug of my invention, showing the plug folded under the end cap, FIGURE 8 is a view of the embodiment of FIGURE 7 showing the plug in the unfolded position, and FIGURE 9 is a schematic diagram of an embodiment of the charging circuit utilized in accordance with the invention.

In the drawings, wherein for the purpose of illustration are shown preferred embodiments of my invention, the numeral 10 designates the housing of the batteries of my invention and 21 designates the charging system, generally. 21 comprises rectifier 13, resistor 14 and capacitor 15. 16 designates the plug prongs for connecting the unit to the power mains and 17 and 17a designate the end cap. 11 designates the insulating shell and 12 designates the storage cell or battery. 18 designates the positive terminal of the battery and 19 designates a glow lamp charger.

The charging circuits, for all the embodiments shown, are described in my co-pending application, entitled "Rechargeable Flashlight Battery and Circuit for Recharging Same," Serial No. 604,923, filed August 20, 1956. In FIGURES 1 and 2 is shown housing 10 which contains, at one end, multicell storage battery 11 which is insulated from 10 by spacer shell 12. Adjacent to 11 is charging system 21 which comprises rectifier 13, resistor 14 and capacitor 15. Plug prongs 16 are of the spring type which spread, as shown in FIGURE 2, when metal cap 17 is removed. When 17 is removed, plug prongs 16 are connected to the electrical power mains to charge 11. When 17 is in place as shown in FIGURE 1, it makes contact with the plug prong 16 which is connected directly to the negative terminal of 11 (as shown in the circuit of my hereinabove referred to co-pending application) and thus serves as the negative terminal of the unit. 18 serves as the positive terminal of the unit and is connected, within 10, directly to the positive terminal of 11.

FIGURE 3 is similar to FIGURE 1 and illustrates a further embodiment of my invention. Glow lamp 19 replaces the charging system 21 of FIGURE 1 (as described in said co-pending application) and lamp base 20 is utilized for connecting the unit to the power mains when 17 is removed so that 11 may be charged. The center contact of 20 is connected to the negative terminal of 11 and makes contact to 17 when 17 is in place. As described above, 17 and 18 are the positive and negative terminals of the unit.

FIGURES 4 and 5 illustrate a still further embodiment of my invention. Here, plug prongs 16 fold into the recesses provided in case 10 when the unit is in use to supply power and they are opened up as shown in FIGURES 5 and 6 when it is necessary to charge 11.

FIGURE 6 illustrates a still further embodiment of my invention. 17 in FIGURE 6 is the end cap which is used when plug prongs 16 need not be folded because there is sufficient space to leave them open and 17a is the position of the end cap when it is necessary to fold 16 because of space limitations.

FIGURES 7 and 8 illustrate a still further modification of foldable plug prongs 16. FIGURE 7 shows the embodiment with 16 folded and in place and FIGURE 8 shows the embodiment with 17 removed and 16 unfolded.

Any of the modifications of my invention may be combined with others. For example, the glow lamp 19 of FIGURE 3 may be used with any of the plug prongs 16 instead of with lamp base 20. Similarly, lamp base 20 may be used with any of the other embodiments provided only that there is sufficient space in the particular housing 10 to accommodate it.

It is within the contemplation of my invention to provide rechargeable units which may be utilized to replace the various types and sizes of dry-cell units. Batteries 11 are preferably of the nickel-iron or nickel-cadmium types and they are assembled in accordance with the voltage and power requirements of the particular unit. The values of 14 and 15 are chosen so that the time constant is many times that of the 60 c.p.s. supply and 15 is never charged to the full voltage of the A.-C. supply. 14 and 15 are of such value that 15 charges sufficiently to charge 11 and no more. The operation of the circuitry, including the use of a thermistor or capacitor to replace 14 and a crystal diode to replace 13, has been described more fully in my co-pending application.

Briefly restated when the A.C. power supply is positive on the resistor side of the circuit the right side of capacitor 15 will be charged positively. The values of resistance 14 and capacitor 15 are chosen so that the capacitance is never charged to the full voltage of the A.C. supply but instead receives an amount no greater than that desired to be applied across battery 11. Since battery 11 is connected in parallel with capacitance 15 the selection of the appropriate values for resistance 14 and capacitance 15 insures that battery 11 will not have excessive voltage applied thereacross.

As the potential from the A.C. power supply begins to decrease on the resistor side of the circuit a point will be reached at which capacitance 15 can discharge. This discharge will take place both through resistance 14 and through rectifier 13 and battery 11 thereby extending the time during which charging voltage is applied to battery 11. The polarity of rectifier 13 prevents the discharge of battery 11 on alternate half cycles.

By way of example and without limitation of the scope of my invention, since it is understood that various circuit embodiments of my invention are taught in my co-pending application, following is a description, as illustrated in FIG. 9, of the circuit connections of the embodiment of FIGURE 1:

Upper plug prong 16 is connected to one end of resistor 14, the other end of resistor 14 is connected to one end of rectifier 13 and to end of capacitor 15. The other end of capacitor 15 is connected to lower plug prong 16 and to the negative terminal of battery 11. The other end of rectifier 13 is connected to the positive terminal of 11. Rectifier 13 is connected so the current flow in it is from resistor 14 to battery 11.

While I have described my invention by means of specific examples and in specific embodiments, I do not wish to be limited thereto for obvious modifications will occur to those skilled in the art without departing from the spirit of my invention or the scope of the subjoined claims.

Having thus described my invention, I claim:

1. A device adapted to be interchangeable with conventional dry cell batteries comprising a housing having substantially the dimensions of said dry cell batteries, said housing including therein storage cell means, charging means connected to said storage cell means, means for connecting said charging means to a power source, said housing including a detachable metal cap section enclosing said means for connecting the charging means to a power source, said metal cap section providing means for connecting the negative terminal of said storage cell means to a load.

2. A device as defined in claim 1 wherein said means for connecting the charging means to a power source comprises a plug having a pair of tensioned prongs extending therefrom, said prongs acting to retain said metal cap section in place, one of said prongs connecting the negative terminal of said storage cell means to said metal cap section.

3. A device as defined in claim 1, wherein said means for connecting said charging means to a power source comprises a foldable prong plug.

4. A device as described in claim 3 wherein said prong plug comprises a pair of foldable prongs, said housing having therein a pair of corresponding depressions for receiving said prongs.

5. A device as described in claim 1 wherein said means for connecting said charging means to a power source comprises a foldable prong plug and said housing comprises a detachable metal cap section telescopically mounted on said housing, said metal cap section being positionable in a plurality of positions to enclose the prong plug, the position of the metal cap section being determined by whether the prong plug is extended or folded.

6. A device as defined in claim 1, wherein said charging means comprises a resistor and capacitor in a series arrangement connected across an alternating current power source, the values of said resistor and capacitor being so chosen that the time constant of said arrangement is greater than the period of the alternating current, and rectifying means connected between the junction of said resistor and capacitor and one terminal of said storage cell means, the other terminal of said storage cell means being connected to the other side of said capacitor; and wherein said means for connecting said charging means to a power source comprises a foldable prong plug.

7. A device as defined in claim 1, wherein said charging means comprises a resistor and capacitor in a series arrangement connected across an alternating current power source, the values of said resistor and capacitor being so chosen that the time constant of said arrangement is greater than the period of the alternating current, and rectifying means connected between the junction of said resistor and capacitor and one terminal of said storage cell means, the other terminal of said storage cell means being connected to the other side of said capacitor; wherein said means for connecting said charging means to a power source comprises a prong plug having a pair of foldable prongs; and wherein said housing has therein a pair of depressions which correspond to and receive said prongs.

8. A device adapted to be interchangeable with conventional dry cell batteries comprising a housing having substantially the dimensions of said dry cell batteries, said housing including therein storage cell means, charging means connected to said storage cell means, means for connecting said charging means to a power source, said housing including a detachable cap portion having a metal contact section, said detachable cap portion enclosing said means for connecting the charging means to said power source, said metal contact section of said cap portion providing means for connecting a terminal of said storage cell means to a load.

9. A device as defined in claim 8 wherein said means connecting said charging means to said power source comprises a plug having a pair of tensioned prongs extending therefrom, said prongs acting to retain said cap portion in place, one of said prongs connecting a terminal of said storage cell means to said metal contact section of said cap portion.

(References on following page)

References Cited in the file of this patent

UNITED STATES PATENTS

| | | |
|---|---|---|
| 1,506,302 | Hopkins | Aug. 26, 1924 |
| 1,623,628 | Lovejoy | Apr. 5, 1927 |
| 1,724,607 | Lincoln | Aug. 13, 1929 |
| 2,369,033 | Eubank | Feb. 6, 1945 |
| 2,377,180 | Pohm | May 29, 1945 |
| 2,451,726 | Fry | Oct. 19, 1948 |
| 2,628,339 | Werner | Feb. 10, 1953 |
| 2,642,520 | Collidge et al. | June 16, 1953 |
| 2,721,946 | Weisberger et al. | Oct. 25, 1955 |

FOREIGN PATENTS

| | | |
|---|---|---|
| 61,248 | France | Oct. 20, 1954 |
| | (Addition) | |

OTHER REFERENCES

Ser. No. 427,480, Zdansky (A.P.C.), Serial No. 427,480, published June 15, 1943.